United States Patent
Mosher et al.

(10) Patent No.: US 10,601,978 B2
(45) Date of Patent: Mar. 24, 2020

(54) TELECOMMUNICATION DEVICE UTILIZATION BASED ON HEARTBEAT COMMUNICATION

(71) Applicant: T-Mobile USA, Inc., Bellevue, WA (US)

(72) Inventors: Michael Mosher, Seattle, WA (US); Ahmad Arash Obaidi, Bellevue, WA (US); Eric W. Yocam, Sammamish, WA (US)

(73) Assignee: T-Mobile USA, Inc., Bellevue, WA (US)

(*) Notice: Subject to any disclaimer, the term of this patent is extended or adjusted under 35 U.S.C. 154(b) by 358 days.

(21) Appl. No.: 14/296,018

(22) Filed: Jun. 4, 2014

(65) Prior Publication Data

US 2015/0358455 A1 Dec. 10, 2015

(51) Int. Cl.
| | | |
|---|---|---|
| *H04M 1/725* | (2006.01) |
| *H04W 4/90* | (2018.01) |
| *H04W 4/50* | (2018.01) |
| *H04M 1/67* | (2006.01) |
| *H04M 1/66* | (2006.01) |
| *H04W 12/08* | (2009.01) |
| *H04W 8/18* | (2009.01) |
| *H04M 1/673* | (2006.01) |

(52) U.S. Cl.
CPC ......... *H04M 1/72577* (2013.01); *H04M 1/66* (2013.01); *H04M 1/67* (2013.01); *H04M 1/72536* (2013.01); *H04W 4/50* (2018.02); *H04W 4/90* (2018.02); *H04W 12/08* (2013.01); *H04M 1/673* (2013.01); *H04W 8/183* (2013.01)

(58) Field of Classification Search
CPC .......... G06F 21/00; G06F 12/04; H04W 4/90; H04W 4/50; H04W 4/001; H04W 12/08; H04W 8/183; H04M 1/67; H04M 1/66; H04M 1/673; H04L 9/00
USPC ...................................... 726/28, 26; 455/411
See application file for complete search history.

(56) References Cited

U.S. PATENT DOCUMENTS

| 6,757,824 | B1* | 6/2004 | England | G06F 9/4416 |
| | | | | 713/156 |
| 7,603,435 | B2* | 10/2009 | Welingkar | G06F 21/88 |
| | | | | 709/217 |
| 8,995,958 | B2* | 3/2015 | Kenney | H04M 1/67 |
| | | | | 455/410 |
| 2008/0115226 | A1* | 5/2008 | Welingkar | G06F 21/88 |
| | | | | 726/28 |
| 2008/0120716 | A1* | 5/2008 | Hall | G06F 21/88 |
| | | | | 726/16 |
| 2010/0169979 | A1* | 7/2010 | Brown | G06F 21/57 |
| | | | | 726/26 |
| 2010/0317324 | A1* | 12/2010 | Brown | G06F 21/305 |
| | | | | 455/411 |

(Continued)

*Primary Examiner* — Margaret G Mastrodonato
(74) *Attorney, Agent, or Firm* — Han Santos, PLLC (57) ABSTRACT

A secure component of a telecommunication device is described herein. The secure component is configured to determine that a threshold amount of time has passed since reception of a heartbeat communication from a remote telecommunication server. In response to determining that the threshold amount of time has passed, the secure component performs at least one of preventing access to one or more services of the telecommunication device or deleting user data from the telecommunication device.

19 Claims, 5 Drawing Sheets

(56) References Cited

U.S. PATENT DOCUMENTS

2011/0055891 A1\* 3/2011 Rice ................. G06F 21/88
 726/2
2013/0065608 A1\* 3/2013 Nakajima ............ G06F 21/552
 455/456.1

\* cited by examiner

TELECOMMUNICATION DEVICE UTILIZATION BASED ON HEARTBEAT COMMUNICATION

BACKGROUND

Theft of telecommunication devices, such as smart phones, is an increasing problem. Such phones are easily stolen, repurposed, and resold, typically in other countries. The popularity of many smart phones and the difficulty in obtaining them in some locations has made the theft of these devices very prevalent, creating difficulties for both the device users and the telecommunication service providers. Users must purchase new devices, and service providers must take steps to make sure that the users of the stolen devices are unable to use their services. Further, with smart phones being used for an increasing number of personal and business tasks, valuable personal or commercial data may also be illicitly obtained as part of the theft.

To address these problems, government entities are increasingly requiring telecommunication services providers to build technology on the network and the devices to enable the telecommunication service providers to send instructions from the network to the devices to disable those devices.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

The disclosure describes herein a secure component of a telecommunication device. The secure component may be located entirely or in part in a boot loader of the telecommunication device, in a trusted execution environment (TEE) of the telecommunication device, or in an embedded subscriber identity module (eSIM) of the telecommunication device. The secure component may be configured to determine that a threshold amount of time has passed since a heartbeat communication from a remote telecommunication server and to, in response, perform at least one of preventing access to one or more telecommunication device services or deleting user data from the telecommunication device. The heartbeat communication may be a heartbeat message from the remote telecommunication server or a response from the remote telecommunication server to a heartbeat message from the telecommunication device.

In various embodiments, the secure component may receive instructions from the remote telecommunication server or input from a user of the telecommunication device. Such instructions or input may configure which telecommunication device services access will be prevented to or what user data will be deleted in the event that the threshold amount of time is passed. The instructions or input may also or instead configure the threshold amount of time. Such instructions may be included in the heartbeat communication.

Further, the secure component may be associated with a user interface for receiving a security code, photo, or biometric from the user of the telecommunication device. The secure component may perform the preventing of access, the deleting of user data, or both based on whether the user fails to enter the security code, photo, or biometric.

In some embodiments, the secure component may utilize a plurality of time thresholds, preventing access to first telecommunication device services or deleting first user data when a first threshold is met and preventing access to additional telecommunication device services or deleting additional user data when a second threshold is met. Also, the preventing access or deleting user data may comprise preventing access to all telecommunication device services (except, in some cases, emergency services) and deleting all user data.

Upon reestablishing heartbeat communication or receiving instructions from the remote telecommunication server to reactive, the secure component may enable access to the blocked telecommunication device service(s).

Overview

Figure 1:
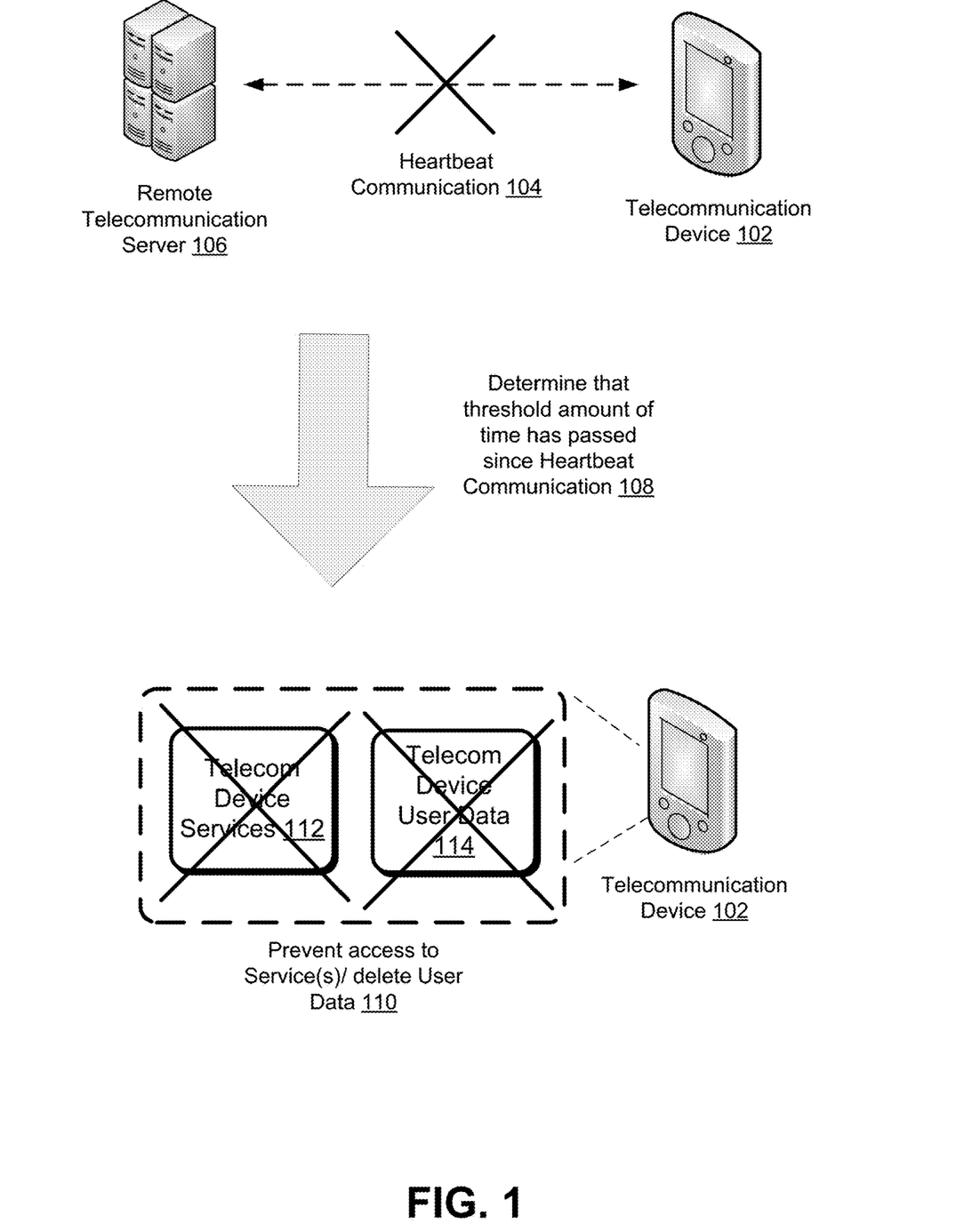
FIG. 1 illustrates an overview of a telecommunication device determining that a threshold amount of time has passed since a heartbeat communication and, in response, preventing access to telecommunication device service(s) or deleting user data.

FIG. 1 illustrates an overview of a telecommunication device determining that a threshold amount of time has passed since a heartbeat communication and, in response, preventing access to telecommunication device service(s) or deleting user data. As illustrated, a telecommunication device 102 may fail to receive a heartbeat communication 104 from a remote telecommunication server 106. The telecommunication device 102 may then determine 108 that it has not received a heartbeat communication 104 for a threshold amount of time. In response to the determining 108, the telecommunication device 102 may perform 110 at least one of preventing access to one or more telecommunication device services 112 or deleting user data 114.

Figure 2A:
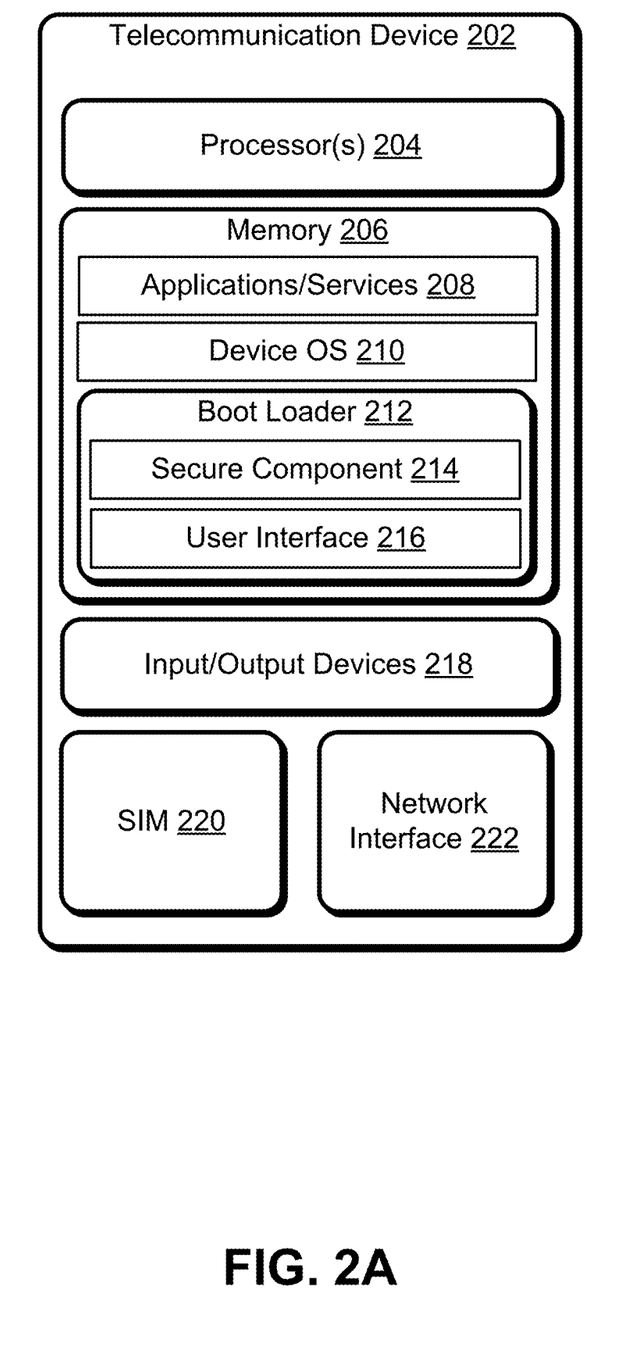
FIGS. 2A-2C illustrate example telecommunication devices with a secure component included in a boot loader, in a trusted execution environment, or in an embedded subscriber identity module.
Figure 2B:
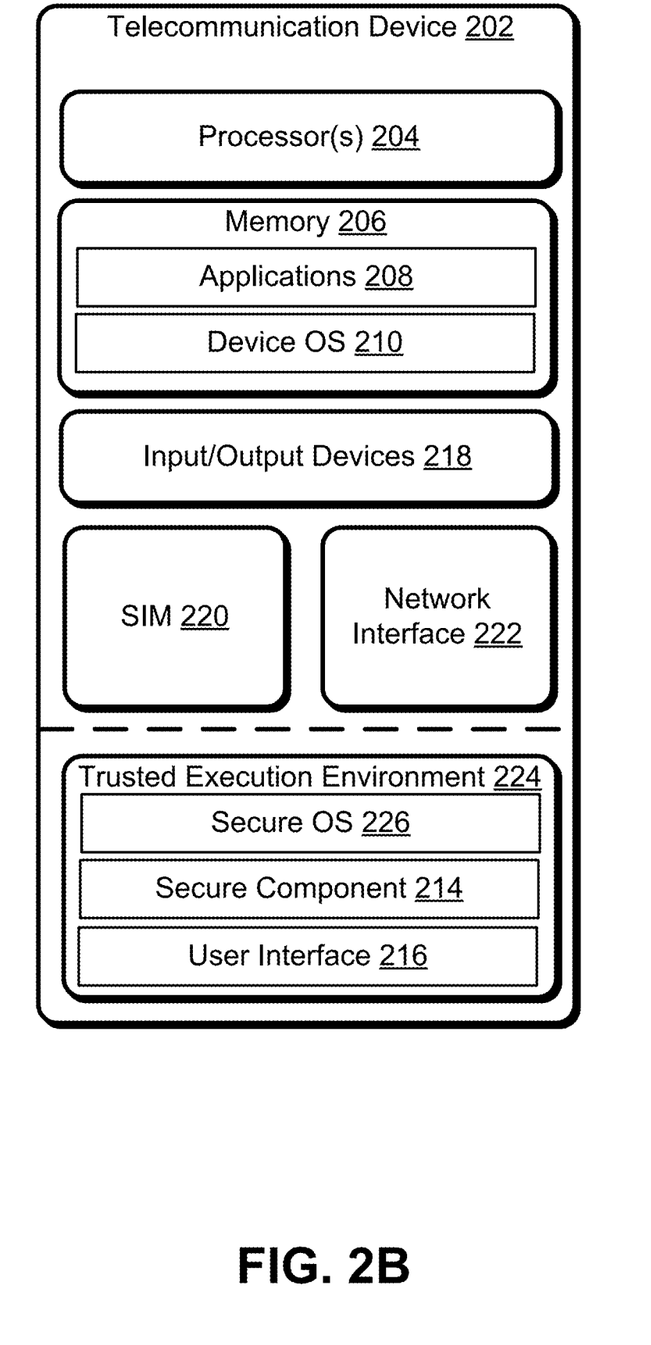
Figure 2C:
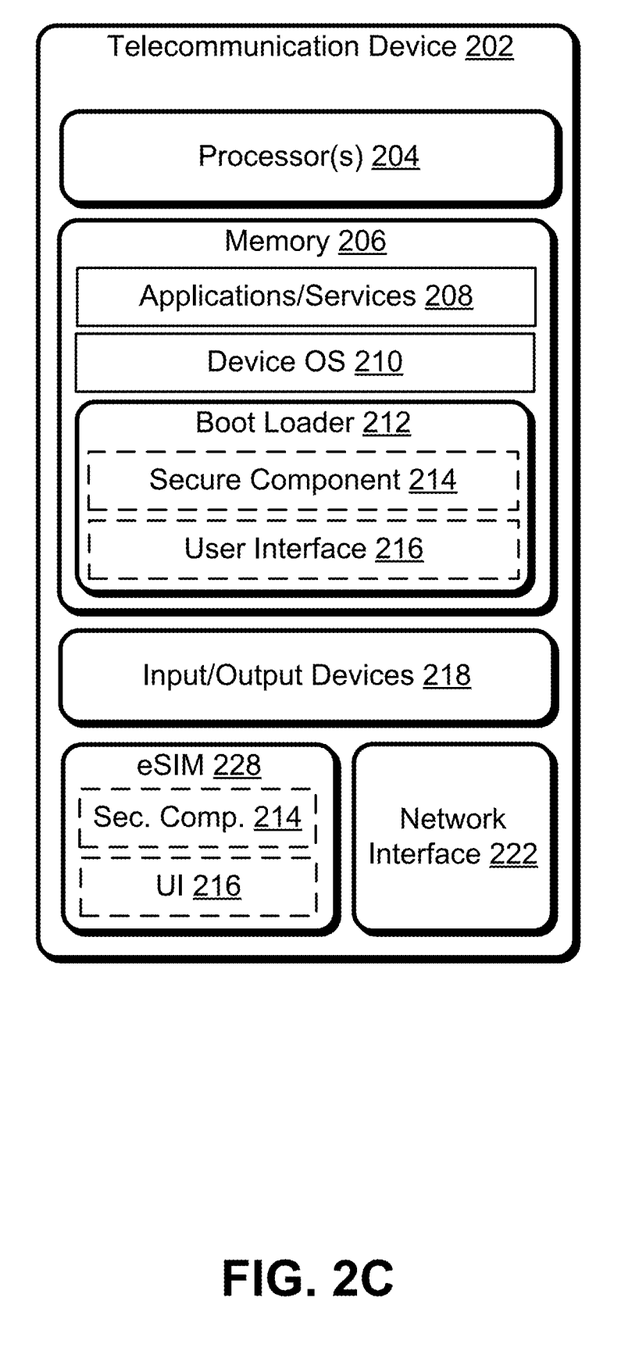

In various embodiments, the telecommunication device 102 may be any sort of telecommunication device, such as a cellular phone, a smart phone, a tablet computer, a personal computer (PC), a laptop computer, an electronic reader, a media player, a gaming device, etc. Such a telecommunication device 102 may be a mobile telecommunication device, capable of being moved from location to location and used in a plurality of locations. The telecommunication device 102 may have a subscriber identity module (SIM), such as an eSIM, to identify the telecommunication device 102 to a telecommunication service provider network (also referred to herein as a "telecommunication network"). Further, the telecommunication device 102 may have a secure component to perform the determining 108 and the performing 110 of the preventing access and/or the deleting user data, a user interface to configure settings of the secure component, and one or both of telecommunication device services 112 or telecommunication device user data 114. Example telecommunication devices 102 are illustrated in FIGS. 2A-2C and are described below in greater detail with reference to those figures.

In some embodiments, the secure component may be implemented in a location of telecommunication device memory that would not result in deletion by a wipe of a telecommunication device operating system (OS). For example the secure component may be located in a boot loader of the telecommunication device 102. Alternatively, the secure component may be implemented in a TEE, which also would not be deleted by a wipe of the OS. Further, part or all of the secure component may be implemented in an eSIM of the telecommunication device 102 that may not be removed. The user interface for configuring the secure component may be stored in a same location as the secure component or in a different location or locations.

In various embodiments, the telecommunication device services 112 may be any sort of applications or services implemented on the telecommunication device 102. For example, the telecommunication device services 112 may include voice calling, video calling, email, text messaging, multimedia messaging, web browsing, media playing, or use of any platform or third party applications. The telecommunication device user data 114 may include any sort of user data, such as emails, photos, songs, media, messaging conversations, recordings, usage history, passwords or personal identification numbers (PINs), or application data.

The remote telecommunication server 106 may also be any sort of computing device or computing devices. For example, the remote telecommunication server 106 could be a cloud computing network of devices. The remote telecommunication server 106 may be part of a telecommunication network or may be a third party application server utilized by a telecommunication service provider. The remote telecommunication server 106 may engage in heartbeat communication 104 either by receiving heartbeat messages and sending responses to those messages or by sending heartbeat messages and receiving responses to those messages. The messages or responses transmitted by the remote telecommunication server 106 may, in some embodiments, include configurations, settings, or instructions for the telecommunication device 102.

In various embodiments, the telecommunication network connecting the telecommunication device 102 and the remote telecommunication server 106 may include any one or more wired or wireless networks. The telecommunication network may include a network of a telecommunication service provider and/or other public networks, private networks, or both. The telecommunication network may also include circuit-switched networks, packet-switched networks, or both. Further, the telecommunication network may include cellular network(s), wireless network(s) (e.g., WiFi, WiMax, etc.), or both.

It should also be appreciated that the telecommunication network could be configured to employ any combination of common wireless broadband communication technologies, including, but not limited to, Long Term Evolution (LTE)/LTE Advanced technology, High-Speed Data Packet Access (HSDPA)/Evolved High-Speed Packet Access (HSPA+) technology, Universal Mobile Telecommunications System (UMTS) technology, Code Division Multiple Access (CDMA) technology, Global System for Mobile Communications (GSM) technology, WiMax technology, or WiFi technology. Further, the backhaul portion of the telecommunication network may be configured to employ any common wireline communication technology, including but not limited to, optical fiber, coaxial cable, twisted pair cable, Ethernet cable, and power-line cable, along with any common wireless communication technology, such as those described above.

In various embodiments, the remote telecommunication server 106 or another device of the telecommunication service provider may remotely configure the telecommunication device 102, setting or updating any sort of configurations, settings, parameters, etc. For example, the remote telecommunication server 106 may provide instructions setting a threshold amount of time (also referred to herein as a "time threshold") that the secure component of the telecommunication device 102 is to wait following a most recent heartbeat communication 104 before performing 110 at least one of preventing access to service(s) 112 or deleting user data 114. The remote telecommunication server 106 may also provide instructions specifying which telecommunication device service(s) 112 should be blocked and what user data 112 should be deleted. Instructions provided by the remote telecommunication server 106 may, in a number of embodiments, be provided in a heartbeat communication 104, such as a heartbeat message or response. In some embodiments, the instructions may specify a plurality of time thresholds, with different telecommunication device service(s) 112 blocked and different user data 114 deleted at each threshold. Such multiple thresholds may enable the remote telecommunication server 106 to specify a more gradual approach to preventing use of the telecommunication device 102.

In further embodiments, the secure component of the telecommunication device 102 may also enable the user of the telecommunication device 102 to update the time threshold(s) and/or the lists of telecommunication device service(s) 112 blocked and user data 114 deleted that are associated with each time threshold. Such updating could be achieved, for instance, through a user interface. A user in an area where the telecommunication device 102 is more likely to be stolen may wish to set a shorter time threshold. Similarly, an employer of the user may be concerned about data security and may wish to have user data 114 more quickly and completely deleted. In some embodiments, the user may be prevented from lengthening the time threshold(s) beyond some value set by the telecommunication service provider.

In various embodiments, the secure component of the telecommunication device 102 is configured to determine 108 that a time threshold since a last heartbeat communication 104 from the remote telecommunication server 106 has passed. This may be the case, for instance, when the telecommunication device 102 lacks access to the telecommunication network or any network which may communicate with the remote telecommunication server 106 for a period of time exceeding the time threshold.

In some embodiments, once the secure component determines that the time threshold has been passed, a user interface of the telecommunication device 102 may request that the user enter a security code (such as a PIN or password), provide a photo, provide a biometric, or provide any combination of a security code, photo, or biometric(s). If the user enters/provides the correct information, the secure component may, for example, reset the time since the last heartbeat communication 104 or set another timer after which either (A) the user will again need to enter the security code, photo, or biometric or (B) the secure component will proceed to prevent access to telecommunication device service(s) 112 or delete user data 114.

If no opportunity to enter a security code, photo, or biometric is provided, or if the user enters the wrong security code, photo, or biometric (after a single try or after a threshold number of tries), the secure component may perform 110 at least one of preventing access to one or more telecommunication device services 112 or deleting telecommunication device user data 114. For example, the secure component may prevent access to email, text messaging, and voice calling (except in some circumstances, emergency voice calling and/or emergency text messaging, which may continue to be enabled). In some embodiments, the performing 110 may include preventing access to all telecommunication device services 112 (except in some circumstances, emergency voice calling and/or emergency text messaging, which may continue to be enabled) and deleting all user data 114.

Also, as described above, the determining 108 and performing 110 may involve multiple time thresholds and gradually increasing blocking of telecommunication device service(s) 112 and deleting of user data 114.

In various embodiments, the secure component may further be configured to enable access to the blocked telecommunication device service(s) 112 responsive to receiving a heartbeat communication 104 or to receiving instructions from the remote telecommunication server 106. Such reactivating may be desired, for example, when a stolen telecommunication device 102 is returned to its rightful owner. Further, if the telecommunication service provider has backed up the user data 114 before it was deleted, the remote telecommunication server 106 may provide the backed up user data 114 to replace the deleted user data 114.

Example Devices

FIGS. 2A-2C illustrate example telecommunication devices with a secure component included in a boot loader, in a trusted execution environment, or in an embedded subscriber identity module. As illustrated in FIG. 2A, a telecommunication device 202, which may be an example of the telecommunication device 102, may include processor(s) 204 and memory 206. The memory 206 may include applications/services 208, a device OS 210, and a boot loader 212. The boot loader 212 may include a secure component 214 and a user interface 216. In addition, the telecommunication device 202 may include input/output devices 218, a SIM 220, and a network interface 222.

In some embodiments, the processor(s) 204 is a central processing unit (CPU), a graphics processing unit (GPU), or both CPU and GPU, or any other sort of processing unit. Each of the one or more processor(s) 204 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 204 may also be responsible for executing all computer applications stored in the memory 206, which can be associated with common types of volatile (RAM) and/or nonvolatile (ROM) memory.

In various embodiments, memory 206 may include system memory, which may be volatile (such as RAM), nonvolatile (such as ROM, flash memory, etc.) or some combination of the two. The memory 206 may also include additional data storage devices (removable and/or non-removable) such as, for example, magnetic disks, optical disks, or tape.

Memory 206 may further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information and which can be accessed by the telecommunication device 202. Any such non-transitory computer-readable media may be part of the telecommunication device 202.

In various embodiments, the applications/services 208 may be any sort of applications, services, or both. The applications/services 208 may be examples of telecommunication device services 112 and may include telecommunication device user data 114.

The device OS 210 may be any operating system, including but not limited to, Microsoft Windows Mobile®, Google Android®, Apple iOS®, Linux Mobile®, or any other telecommunication device operating system.

In various embodiments, the boot loader 212 which may initiate a boot sequence following a power cycle event (e.g., turning the telecommunication device 202 OFF and then turning it back ON). As shown in FIG. 2A, the boot loader 212 may include the secure component 214 and user interface 216, which may be examples of the secure component and user interface of the telecommunication device 102 that are discussed above in detail with reference to FIG. 1.

As is further illustrated in FIG. 2A, the input/output devices 218 include any sort of output devices known in the art, such as a display (e.g., a liquid crystal display), speakers, a vibrating mechanism, or a tactile feedback mechanism. Input/output devices 218 also include ports for one or more peripheral devices, such as headphones, peripheral speakers, or a peripheral display. Further, input/output devices 218 include any sort of input devices known in the art. For example, input/output devices 218 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

In some embodiments, the SIM 220 can indicate a customer account, maintained by the telecommunication service provider, as being associated with the telecommunication service provider (e.g., a subscriber corresponding to a particular international mobile subscriber identity or IMSI). The SIM 220 may include credentials for authenticating the telecommunication device 202 to the telecommunication network. Further, the SIM 220 may be removable or non-removable (e.g., an eSIM).

In various embodiments, the network interface 220 may include any sort of transceivers known in the art. For example, network interface 220 may include a radio transceiver that performs the function of transmitting and receiving radio frequency communications via an antenna. The network interface 220 may facilitate wireless connectivity between the telecommunication device 202 and other devices through the telecommunication network, such as the remote telecommunication server 106. In addition, the network interface 220 may also include a wireless communication transceiver and a near field antenna for communicating over unlicensed wireless Internet Protocol (IP) networks, such as local wireless data networks and personal area networks (e.g., Bluetooth or near field communication (NFC) networks). Further, the network interface 220 may include wired communication components, such as an Ethernet port.

FIG. 2B illustrates an example of the telecommunication device 202 which includes a TEE partition 224, which may include a secure OS 226, the secure component 214, and the user interface 216. In various implementations, the TEE partition 224 may be stored in memory 206, or alternatively, within a separate, dedicated TEE memory (not shown). Similarly, the TEE partition 224 may also be configured to operate with a dedicated TEE processor (not shown), which can allow the TEE partition 224 to operate independent from the telecommunication device 202's main hardware components, including both its processor(s) 204 and memory 206. This dedicated TEE hardware scenario may be particularly beneficial during boot executions, to prevent any unauthorized access of the TEE partition 224. Additionally, the TEE partition 224 may include a secure OS 226 to execute applications (referred to as trustlet applications). Such trustlet applications may be safely executed before and/or during concurrent executions of the device OS 210, without any requisite OS-level data sharing that could potentially corrupt the TEE partition 224.

In various embodiments, as shown in FIG. 2B, the secure component 214 and user interface 216 may be implemented in the TEE partition 224 rather than in the boot loader 212. Such a secure component 214 and user interface 216 may, in some embodiments, be trustlet applications. In other embodiments, the secure component 214 and/or user interface 216 may be distributed between the boot loader 212 and TEE partition 224.

FIG. 2C illustrates a telecommunication device 202 in which the SIM 220 is an eSIM 228. The eSIM 228 may not be removable from the telecommunication device 202, frustrating efforts to replace the eSIM 228 with another SIM to facilitate stolen use of the telecommunication device 202. As illustrated, the secure component 214 and user interface 216 may be implemented partially or entirely in the eSIM 228. If partially, other parts of the secure component 214 and user interface 216 may be implemented in, for instance the boot loader 212 (as shown), the TEE partition 224 (not shown), or both (no shown).

Example Processes

Figure 3:
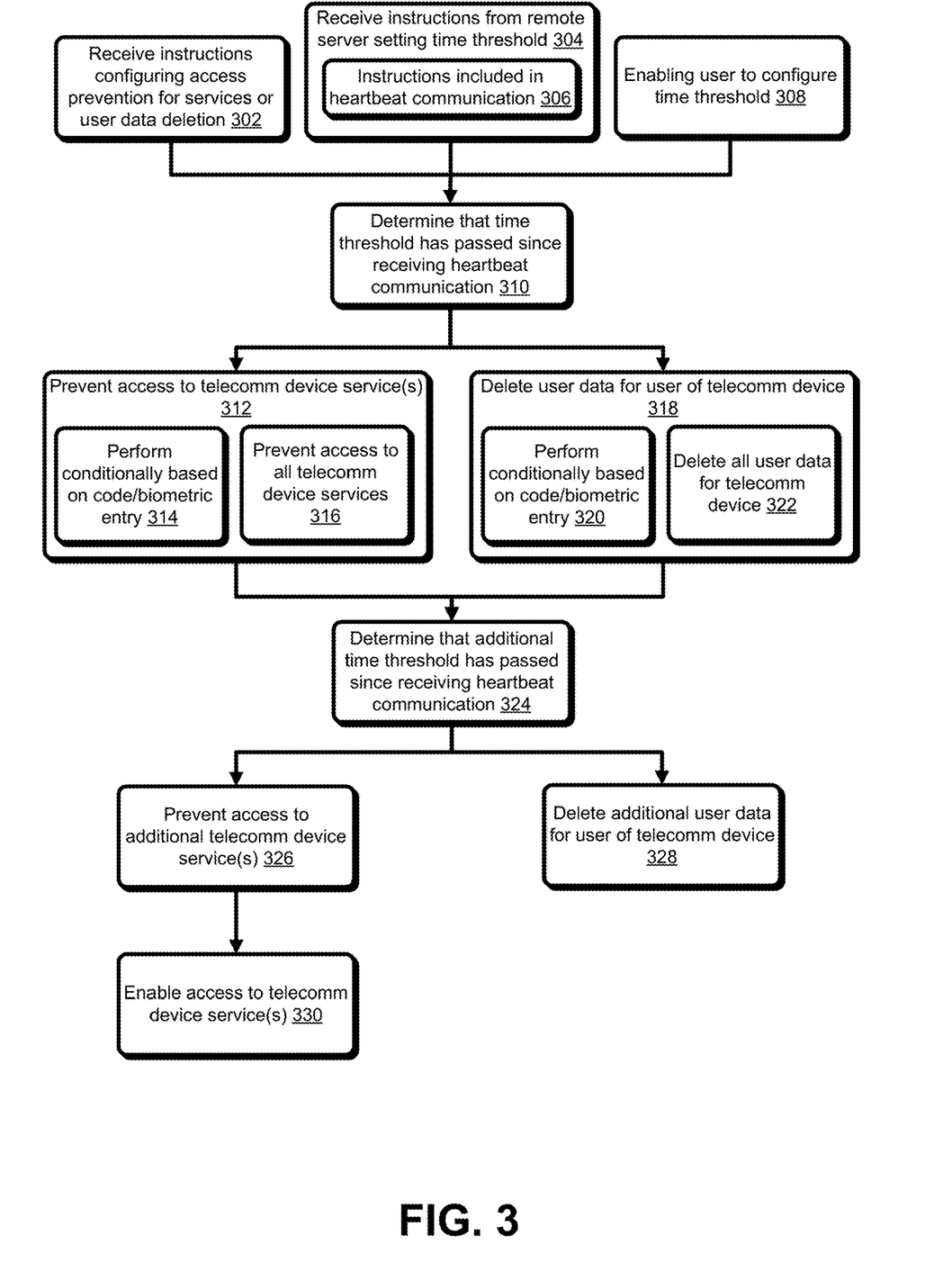
FIG. 3 illustrates a flow chart of an example process for determining that a threshold amount of time has passed since a heartbeat communication and, in response, preventing access to telecommunication device service(s) or deleting user data.

FIG. 3 illustrates an example process. This process is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 3 illustrates a flow chart of an example process for determining that a threshold amount of time has passed since a heartbeat communication and, in response, preventing access to telecommunication device service(s) or deleting user data. The process may include, at 302, receiving, by a secure component of a telecommunication device, instructions from the remote telecommunication server or input from a user of the telecommunication device. The instructions or input may configure which of one or more telecommunication device services access will be prevented to or what user data will be deleted in the event that a threshold amount of time passes from the reception of a heartbeat communication.

At 304, the secure component may receive instructions from the remote telecommunication server setting the threshold amount of time. In some embodiments, at 306, the instructions may be included in a heartbeat communication.

At 308, the secure component may enable a user of the telecommunication device to configure the threshold amount of time.

At 310, the secure component may determine that the threshold amount of time has passed since reception of a heartbeat communication from a remote telecommunication server. The heartbeat communication may be a heartbeat message from the remote telecommunication server or a response from the remote telecommunication server to a heartbeat message from the telecommunication device At 312, in response to determining that the threshold amount of time has passed, the secure component may prevent access to one or more telecommunication device services. At 314, the preventing may be performed conditionally based at least in part on whether a user of the telecommunication device fails to enter a security code or provide a photo or a biometric. At 316, the preventing may comprise preventing access to all telecommunication device services except emergency services.

At 318, in response to determining that the threshold amount of time has passed, the secure component may delete user data from the telecommunication device. At 320, the deleting may be performed conditionally based at least in part on whether a user of the telecommunication device fails to enter a security code or provide a photo or a biometric. At 322, the deleting may comprise deleting all user data from the telecommunication device.

At 324, the secure component may determine that a second threshold amount of time has passed since reception of the heartbeat communication from the remote telecommunication server. The second threshold amount of time may be greater than the threshold amount of time. At 326, in response to determining that the second threshold amount of time has passed, the secure component may prevent access to an additional one or more services of the telecommunication device. Alternatively or additionally, at 328, in response to determining that the second threshold amount of time has passed, the secure component may delete additional user data from the telecommunication device.

At 330, subsequent to preventing access to the one or more telecommunication device services or to the additional telecommunication device services, the secure component may receive instructions from the remote telecommunication server enabling access to the one or more telecommunication device services. Such instructions may be provided following reception of a subsequent heartbeat communication or instructions from the remote telecommunication server.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A telecommunication device comprising:
a processor;
a transceiver to communicate with a remote telecommunication server;
a secure component configured to be operated by the processor to engage in heartbeat communications with the remote telecommunication server via the transceiver; and
a user interface configured to be operated by the processor to:
receive at least one of a photo or a biometric,
enable a first user input of a list of a portion of user data that is less than an entirety of user data, the portion of user data to be deleted in response to an expiration of a first threshold amount of time, and
enable a second user input to configure a first threshold amount of time and a second threshold amount of time that correspond to amounts of time that the secure component is to wait following the heartbeat communication before restricting data access to the telecommunication device,
wherein the secure component performs:
correlating the first threshold amount of time and the portion of the user data, based at least in part on the first user input and the second user input,
correlating the second threshold amount of time and the remaining portion of the user data, based at least in part on the first user input and the second user input,
in response to determining that the first threshold amount of time has passed since reception of one of a photo or a biometric, deleting the portion of user data,
in response to determining that the second threshold amount of time has passed since reception of the heartbeat communication from the remote telecommunication server
deleting the remaining portion of user data from the telecommunication device.

2. The telecommunication device of claim 1, wherein the secure component is further configured to further perform:
preventing access to one or more services of the telecommunication device except emergency services.

3. The telecommunication device of claim 1, wherein the secure component is an operating system boot loader or a component of a trusted operating system.

4. The telecommunication device of claim 1, wherein the user interface is further configured to receive a photo, and
wherein deleting the portion of user data that is less than the entirety of user data is based at least in part on a failure to receive, via the user interface, a combination of the biometric and the photo.

5. A method comprising:
determining, by a secure component of a telecommunication device, that a first threshold amount of time has passed since reception of a heartbeat communication from a remote telecommunication server;
preventing, by the secure component, access to at least a voice calling service via the telecommunications device, while contemporaneously permitting access to a normal operation of a text messaging service via the telecommunications device;
determining that a second threshold amount of time has passed since reception of the heartbeat communication from the remote telecommunication server, the second threshold amount of time being greater than the first threshold amount of time; and
preventing, by the secure component, access to the text messaging service via the telecommunications device,
wherein the secure component is a trustlet application executing in a trusted execution environment of the telecommunication device, the trusted execution environment executing the secure component independently of a boot loader of the telecommunication device.

6. The method of claim 5, wherein the heartbeat communication is a heartbeat message from the remote telecommunication server or a response from the remote telecommunication server to a heartbeat message from the telecommunication device.

7. The method of claim 5, further comprising receiving instructions from the remote telecommunication server that set the first or the second threshold amount of time.

8. The method of claim 7, wherein the instructions are included in a heartbeat communication.

9. The method of claim 5, further comprising enabling a user of the telecommunication device to configure the first or the second threshold amount of time.

10. The method of claim 5, further comprising:
preventing access to one or more telecommunication device services based at least in part on a user of the telecommunication device failing to enter a combination of a photo and a biometric.

11. The method of claim 5, further comprising:
preventing access to an email messaging service via the telecommunications device, in response to determining that the first threshold amount of time has passed since reception of the heartbeat communication from the remote telecommunication server.

12. The method of claim 5, further comprising, subsequent to preventing access to the voice calling service via the telecommunications device, receiving instructions from the remote telecommunication server enabling access to the voice calling service via the telecommunications device.

13. The method of claim 5, wherein the trusted execution environment executes the secure component independently of the boot loader and separate and distinct from a device operating system of the telecommunication device.

14. One or more non-transitory computer-readable media having computer-executable instructions for a secure component stored thereon which, when executed by a telecommunication device, perform operations comprising:
configuring, via user input, a first threshold amount of time and a second threshold amount of time that correspond to amounts of time that the secure component is to wait following reception of a heartbeat communication from a remote telecommunication server before restricting data access to the telecommunication device;
determining that the first threshold amount of time has passed since reception of the heartbeat communication from the remote telecommunication server and receipt of a combination of a photo and a biometric of a user of the telecommunication device;
deleting a portion of user data that is less than an entirety of user data from the telecommunication device, the portion of user data having been identified via a user selection on a user interface of the telecommunication device;
determining that the second threshold amount of time has passed since reception of the heartbeat communication from the remote telecommunication server, the second threshold amount of time being greater than the first threshold amount of time; and deleting an additional portion of user data from the telecommunication device,
wherein an entirety of the secure component is executable via an embedded subscriber identity module (eSIM).

15. The one or more non-transitory computer-readable media of claim 14, wherein the operations further comprise:
receiving instructions from the remote telecommunication server setting the first threshold amount of time; or
enabling a user of the telecommunication device to configure the first threshold amount of time.

16. The one or more non-transitory computer-readable media of claim 14, wherein the operations further comprise receiving instructions from the remote telecommunication server or input from a user of the telecommunication device, the instructions or input configuring what user data will be deleted.

17. The one or more non-transitory computer-readable media of claim 14, wherein the operations further comprise deleting the portion of user data or the additional portion of user data from the telecommunication device based at least in part on a failure of the user of the telecommunication device to enter the combination of the photo and the biometric.

18. The one or more non-transitory computer-readable media of claim 14, wherein deleting the additional portion of user data from the telecommunication device comprises deleting all user data.

19. The one or more non-transitory computer-readable of claim 14, wherein the secure component is an operating system boot loader or a component of a trusted operating system.

* * * * *